(12) United States Patent
McCooey

(10) Patent No.: US 8,517,672 B2
(45) Date of Patent: Aug. 27, 2013

(54) EPICYCLIC GEARBOX

(75) Inventor: Francis William McCooey, Derry, NH (US)

(73) Assignee: General Electric Company, Schenectady, NY (US)

( * ) Notice: Subject to any disclaimer, the term of this patent is extended or adjusted under 35 U.S.C. 154(b) by 793 days.

(21) Appl. No.: 12/710,720

(22) Filed: Feb. 23, 2010

(65) Prior Publication Data

US 2011/0206498 A1    Aug. 25, 2011

(51) Int. Cl.
*F02K 3/072*    (2006.01)

(52) U.S. Cl.
USPC ............ 415/124.1; 415/122.1; 415/124.2; 60/39.162; 60/226.1; 60/268

(58) Field of Classification Search
USPC ............ 415/122.1, 124.1, 124.2; 60/268, 60/39.162, 39.163
See application file for complete search history.

(56) References Cited

U.S. PATENT DOCUMENTS

| | | | |
|---|---|---|---|
| 2,472,878 A * | 6/1949 | Baumann | 415/69 |
| 4,251,987 A | 2/1981 | Adamson | |
| 4,459,876 A | 7/1984 | Kohler et al. | |
| 4,827,712 A | 5/1989 | Coplin | |
| 4,916,894 A | 4/1990 | Adamson et al. | |
| 5,010,729 A | 4/1991 | Adamson et al. | |
| 6,158,210 A | 12/2000 | Orlando | |
| 7,490,460 B2 * | 2/2009 | Moniz et al. | 60/268 |
| 7,493,753 B2 | 2/2009 | Moniz et al. | |
| 7,513,103 B2 | 4/2009 | Orlando et al. | |
| 7,526,913 B2 | 5/2009 | Orlando et al. | |
| 2002/0069637 A1 * | 6/2002 | Becquerelle et al. | 60/226.1 |
| 2003/0162630 A1 | 8/2003 | Poulin et al. | |
| 2007/0087892 A1 | 4/2007 | Orlando et al. | |
| 2007/0240399 A1 | 10/2007 | Orlando et al. | |
| 2008/0098714 A1 | 5/2008 | Orlando et al. | |
| 2008/0098715 A1 | 5/2008 | Orlando et al. | |
| 2008/0098716 A1 | 5/2008 | Orlando et al. | |
| 2008/0098717 A1 | 5/2008 | Orlando et al. | |
| 2008/0098718 A1 | 5/2008 | Henry et al. | |
| 2008/0120839 A1 | 5/2008 | Schilling | |
| 2008/0148707 A1 | 6/2008 | Schilling | |

\* cited by examiner

*Primary Examiner* — Nathaniel Wiehe
*Assistant Examiner* — Aaron Jagoda
(74) *Attorney, Agent, or Firm* — General Electric Co.; Steven J. Rosen; David J. Clement

(57) ABSTRACT

An epicyclic gear train includes planetary gears rotatably mounted on spindles supported by an annular carrier and including axially spaced apart forward and aft sets of output teeth extending radially outwardly from a planetary gear hub and axially spaced apart forward and aft roller bearings disposed between planetary gears and spindles. The forward and aft roller bearings are axially aligned with or adjacent to spaced apart forward set of output teeth and input gear respectively. A ring gear meshes with forward set of output teeth and an external gear meshes with aft set of output teeth. An input gear fixedly attached to hub aft of aft set of output teeth and engaged with a sun gear. The output teeth, input gear, ring gear, external gear, and sun gear may all be helical. A turbofan gas turbine engine may include counter-rotatable first and second fan stages driven by a low pressure turbine through the gear train.

21 Claims, 5 Drawing Sheets

EPICYCLIC GEARBOX

BACKGROUND OF THE INVENTION

1. Field of the Invention

The invention relates to epicyclic gearboxes with particular application to aircraft gas turbine engines with counter-rotatable fans.

2. Description of Related Art

An aircraft gas turbine engine of the turbofan type generally includes a forward fan and booster compressor, a middle core engine, and an aft low pressure power turbine. The core engine includes a high pressure compressor, a combustor, and a high pressure turbine in a serial flow relationship. The high pressure compressor and high pressure turbine of the core engine are interconnected by a high pressure shaft. The high pressure compressor, turbine, and shaft essentially form the high pressure rotor or spool. The high pressure compressor is rotatably driven to compress air entering the core engine to a relatively high pressure. This high pressure air is then mixed with fuel in the combustor and ignited to form a high energy gas stream. The gas stream flows aft and passes through the high pressure turbine, rotatably driving it and the high pressure shaft which, in turn, rotatably drives the compressor. The gas stream leaving the high pressure turbine is expanded through a second or low pressure turbine. The low pressure turbine rotatably drives the fan and booster compressor via a low pressure shaft, all of which form the low pressure rotor or spool. The low pressure shaft extends through the high pressure rotor.

Some fan jet engines have been designed with counter-rotating fans and some with counter-rotating fans and/or boosters or low pressure compressors. U.S. Pat. Nos. 4,790,133, 4,860,537, 5,307,622 and 6,732,502 disclose counter-rotating low pressure turbines (LPT) that power counter-rotating fans and booster or low pressure compressors. Most of the thrust produced is generated by the fan. There are also various designs for counter-rotating fan engines that use gearboxes to effect counter-rotation of the fans and boosters. Counter-rotating fans, boosters, and turbines greatly enhance the engine's fuel efficiency. U.S. patent application Ser. No. 11/555,042 discloses using a low-pressure turbine to drive counter-rotating forward and aft fans through an epicyclic gearbox.

Size, weight, and reliability of an epicyclic gearbox depends a great deal on planet bearing loads, life requirements, and gear tooth stresses. It is highly desirable to significantly reduce the planet bearing loads of a counter-rotating epicyclic gearbox in order to increase gearbox reliability. It is also highly desirable to reduced loads enabling the use of smaller bearings which reduces weight and improves life of the gearbox. Smaller bearings also decrease the heat generation of the gearbox which results in an efficiency improvement and reduced oil flow requirements.

It is also highly desirable to reduce or eliminate gear misalignment that results from the twisting due to torque. Improved alignment reduces or eliminates the need to modify gear tooth shape to compensate for deflection, resulting in improved gear durability and reduced gear tooth stresses.

SUMMARY OF THE INVENTION

An epicyclic gear train includes planetary gears rotatably mounted on spindles supported by an annular carrier. Each of the planetary gears includes axially spaced apart forward and aft sets of output teeth extending radially outwardly from a hollow planetary gear hub. Axially spaced apart forward and aft roller bearings are disposed between the planetary gears and the spindles.

An exemplary embodiment of the epicyclic gear train further includes the forward and aft roller bearings being axially aligned with or adjacent to the spaced apart forward and aft sets of output teeth. An input gear is fixedly attached to the planetary gear hub aft of the aft set of output teeth of each of the planetary gears. In a more particular embodiment, the forward roller bearing is axially aligned with the forward set of output teeth and the aft roller bearing is axially adjacent to the input gear.

The exemplary embodiment of the epicyclic gear train further includes a ring gear circumscribing and engaging the forward set of output teeth and an external gear meshing with the aft set of output teeth. The input gear meshes with a sun gear. The forward set of output teeth meshes with the ring gear radially outwardly of the spindles and the aft set of output teeth meshes with the external gear radially outwardly of the spindles. The input gear of each of the planetary gears meshes with the sun gear radially inwardly of the spindles. The forward and aft set of output teeth, the input gear of the planetary gears, the ring gear, the external gear, and the sun gear may be helical.

The epicyclic gear train may be used in an epicyclic gearbox further including the spindles supported by forward and aft conical carrier frames of the annular carrier. The forward and aft conical carrier frames include radially outer forward and aft carrier flanges respectively, radially inner forward and aft support flanges respectively fixedly supporting the spindles therebetween and connected by conical forward and aft support beams to the forward and aft carrier flanges.

A turbofan gas turbine engine may incorporate the epicyclic gearbox to counter rotatably drive counter-rotatable first and second fan stages radially supported, at least in part, by a fan frame in a fan section of the engine. A low pressure turbine downstream of the fan section is drivingly connected to the first and second fan stages by a low pressure shaft through the epicyclic gear train in the epicyclic gearbox. In an exemplary embodiment of the engine, the second fan stage is connected to a ring gear circumscribing and meshing with the forward set of output teeth, the first fan stage is connected to the external gear meshing with the aft set of output teeth, the input gear is fixedly attached to the planetary gear hub aft of the aft set of output teeth of each of the planetary gears, and the input gear of each of the planetary gears meshes with the sun gear connected to the low pressure shaft. The forward and aft carrier flanges of the forward and aft conical carrier frames are mounted to and supported by the fan frame.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
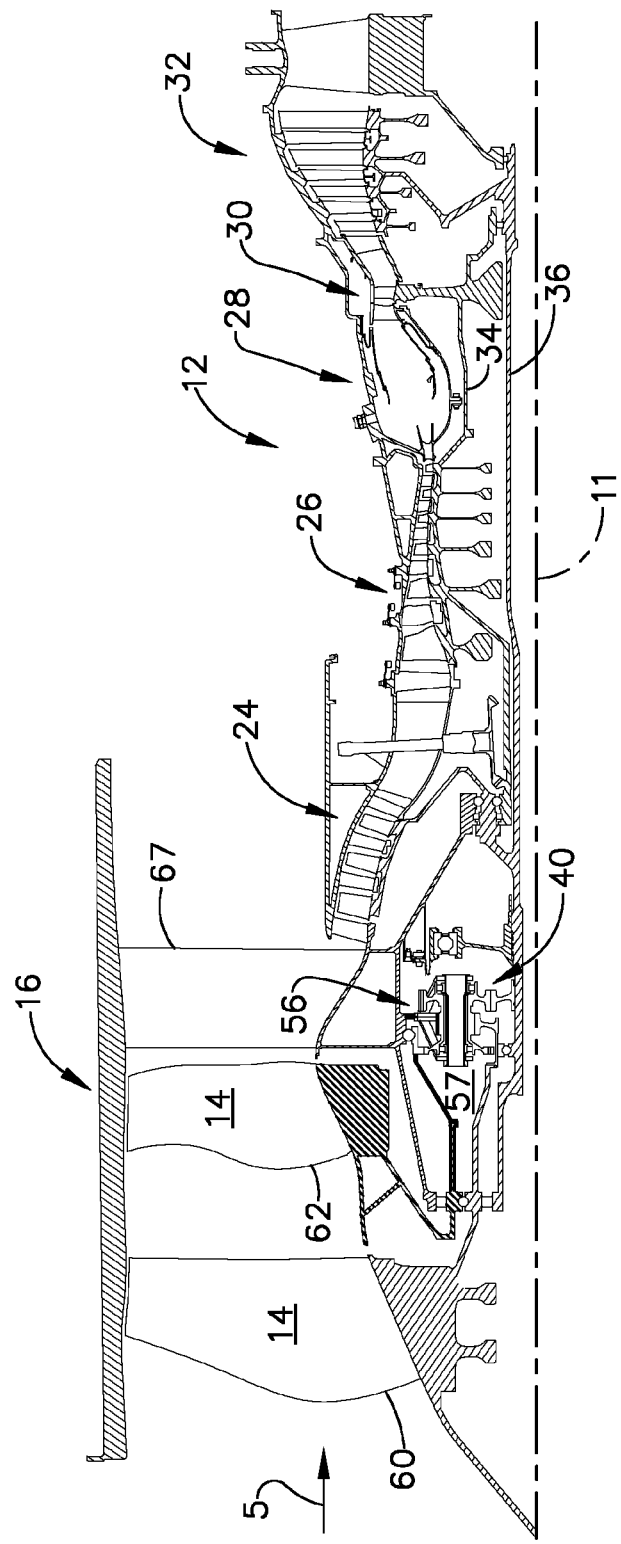
FIG. 1 is a longitudinal sectional view diagrammatical illustration of an exemplary embodiment of an aircraft turbofan gas turbine engine with counter-rotatable forward and aft fans driven by low pressure turbine through an epicyclic gearbox in which each planetary gear includes forward and aft sets of teeth mounted on a common cylinder.
Figure 2:
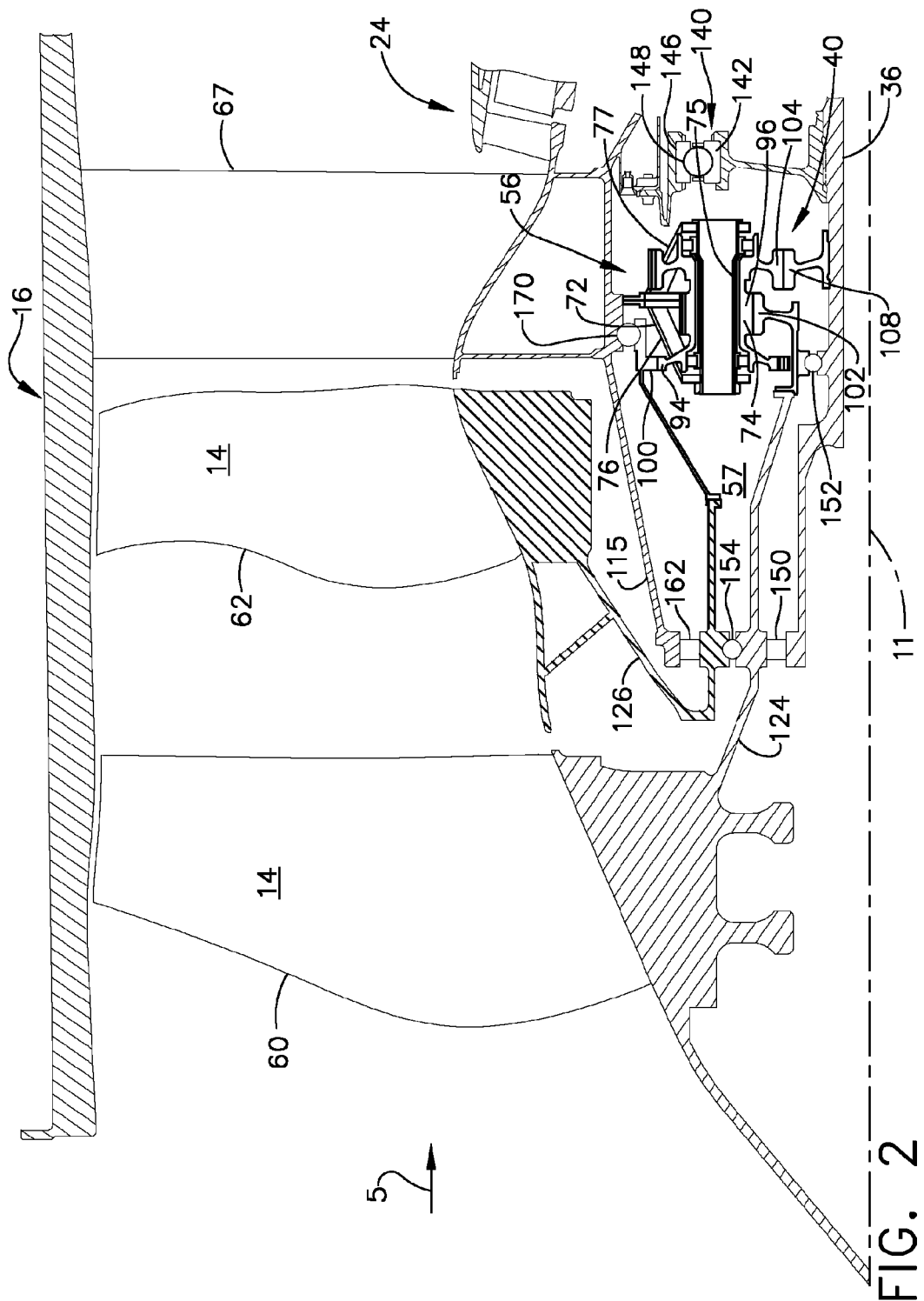
FIG. 2 is an enlarged more detailed longitudinal sectional view illustration of the epicyclic gearbox connected to the counter-rotatable fans illustrated in FIG. 1.

Illustrated in FIGS. 1 and 2 is an exemplary turbofan gas turbine engine 10 circumscribed about an engine centerline 11 and having a counter-rotatable fan section 16 which receives inlet airflow of ambient air 5. The fan section 16 includes counter-rotatable first and second fan stages 60, 62 having fan blades 14. One of the first and second fan stages 60, 62 is rotatable in a clockwise direction about the engine centerline 11 and another of the fan stages is rotatable in a counter-clockwise direction about the engine centerline 11. Thus, the first and second fan stages 60, 62 may be described as being counter-rotatable with respect to each other and are at least in part radially supported by a fan frame 67.

Referring to FIG. 1, downstream and aft of the fan section 16, in downstream serial flow relationship, is a booster compressor 24, a high pressure multi-stage axial-flow compressor (HPC) 26, a combustor 28, a high pressure turbine (HPT) 30, and a low pressure turbine (LPT) 32 from which the combustion gases are discharged from the engine 10. The combustor 28 mixes fuel with the air 5 pressurized by the HPC 26 for generating combustion gases which flow downstream through the high pressure turbine (HPT) 30. A high pressure shaft 34 joins the HPT 30 to the HPC 26. The high pressure compressor 26, combustor 28, and high pressure turbine 30 collectively are referred to as a core engine 12 which includes, for the purposes of this patent, the high pressure shaft 34.

Referring to FIGS. 1 and 2, the counter-rotatable first and second fan stages 60, 62 are drivenly connected to the low pressure turbine (LPT) 32 by a low pressure shaft 36 through an epicyclic gear train 40 in an epicyclic gearbox 56 so as to be counter-rotatable with respect to each other. The gearbox 56 is disposed within a fan cavity 57 of the engine 10 and axially and radially supported by the fan frame 67.

Figure 3:
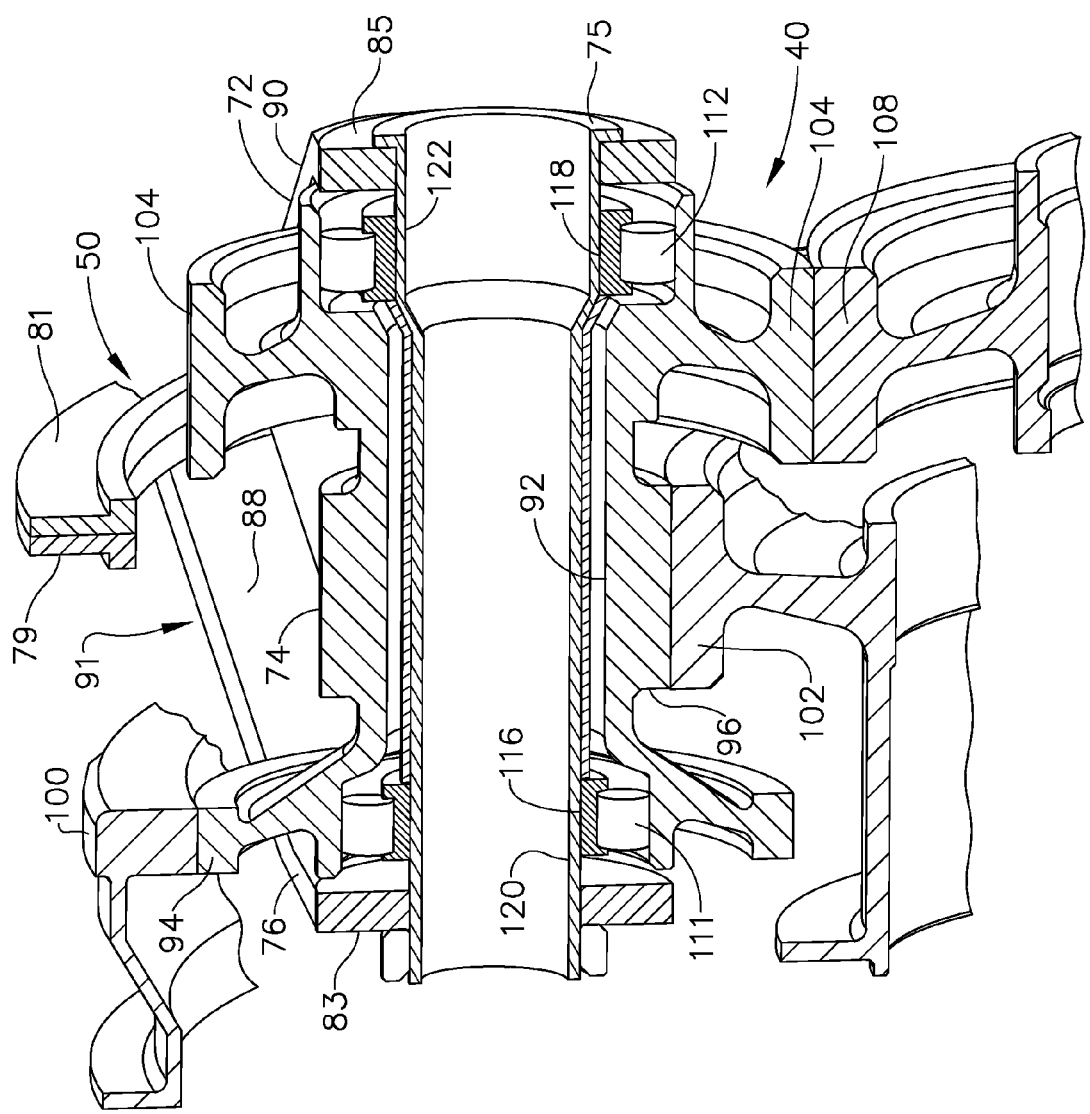
FIG. 3 is perspective view diagrammatical illustration of an epicyclic gear train in the gearbox illustrated in FIG. 2.
Figure 4:
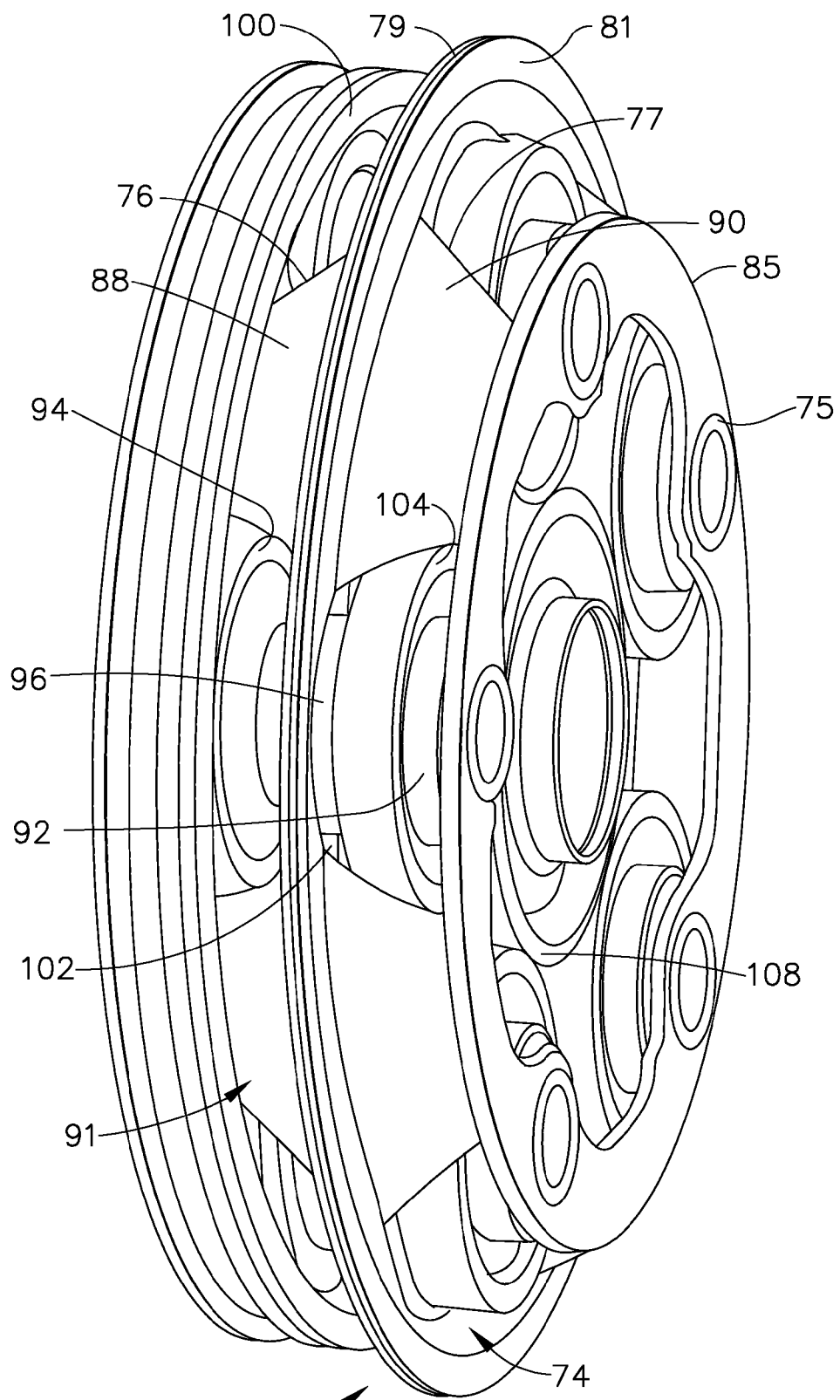
FIG. 4 is perspective view diagrammatical illustration of the gear train illustrated in FIG. 3.

The epicyclic gear train 40 and gearbox 56, as further illustrated in FIGS. 3 and 4, includes an annular planetary gear carrier 72 supported by the fan frame 67 and planetary gears 74 rotatably mounted on spindles 75 supported by forward and aft conical carrier frames 76, 77 of an annular carrier 72. The forward and aft conical carrier frames 76, 77 include radially outer forward and aft carrier flanges 79, 81 respectively mounted to and supported by the fan frame 67. The forward and aft conical carrier frames 76, 77 include radially inner forward and aft support flanges 83, 85 respectively fixedly supporting the spindles 75 therebetween. The forward and aft support flanges 83, 85 are connected by conical forward and aft support beams 88, 90 to the forward and aft carrier flanges 79, 81 respectively, thus, forming cage 91 to rotatably support the planetary gears 74. The forward and aft support beams 88, 90 are circumferentially disposed between the planetary gears 74.

Each of the planetary gears 74 includes axially spaced apart forward and aft sets of output teeth 94, 96 extending radially outwardly from a hollow planetary gear hub 92. The forward set of output teeth 94 of the planetary gears 74 meshes with a second fan ring gear 100 connected to and operable to drive the second fan stage 62. The aft set of output teeth 96 of the planetary gears 74 meshes with a first fan external gear 102 connected to and operable to drive the first fan stage 60. An external gear is one with the teeth formed on the outer surface of a hub, a cylinder, or a cone. Conversely, an internal or ring gear is one with the teeth formed on the inner surface of a hub, a cylinder, or a cone. An input gear 104 is fixedly attached to the planetary gear hub 92 aft of the aft set of output teeth 96. The input gear 104 of each of the planetary gears 74 meshes with a sun gear 108 directly connected to the low pressure shaft 36. The sun gear 108 meshes with the input gear 104 of each of the planetary gears 74 radially inwardly of the spindles 75. The forward set of output teeth 94 meshes with the second fan ring gear 100 radially outwardly of the spindles 75 and the aft set of output teeth 96 meshes with the first fan external gear 102 radially outwardly of the spindles 75 in order to counter rotate the first and second fan stages 60, 62. The forward and aft support beams 88, 90 are circumferentially disposed between the forward and aft set of output teeth 94, 96 and the input gear 104.

Axially spaced apart forward and aft roller bearings 111, 112 are disposed between the planetary gears 74 and the spindles 75. The forward and aft roller bearings 111, 112 are axially aligned with or adjacent to the spaced apart forward set of output teeth 94 and the input gear 104 respectively. In the exemplary embodiment of the gearbox 56 illustrated herein, the forward roller bearing 111 is axially aligned with the forward set of output teeth 94 and the aft roller bearing 112 is axially adjacent to the input gear 104. The forward and aft roller bearings 111, 112 are disposed within forward and aft races 116, 118 mounted to the spindles 75 and radially disposed between the forward and aft races 116, 118 and forward and aft hub sections 120, 122 of the planetary gear hub 92 respectively.

Figure 5:
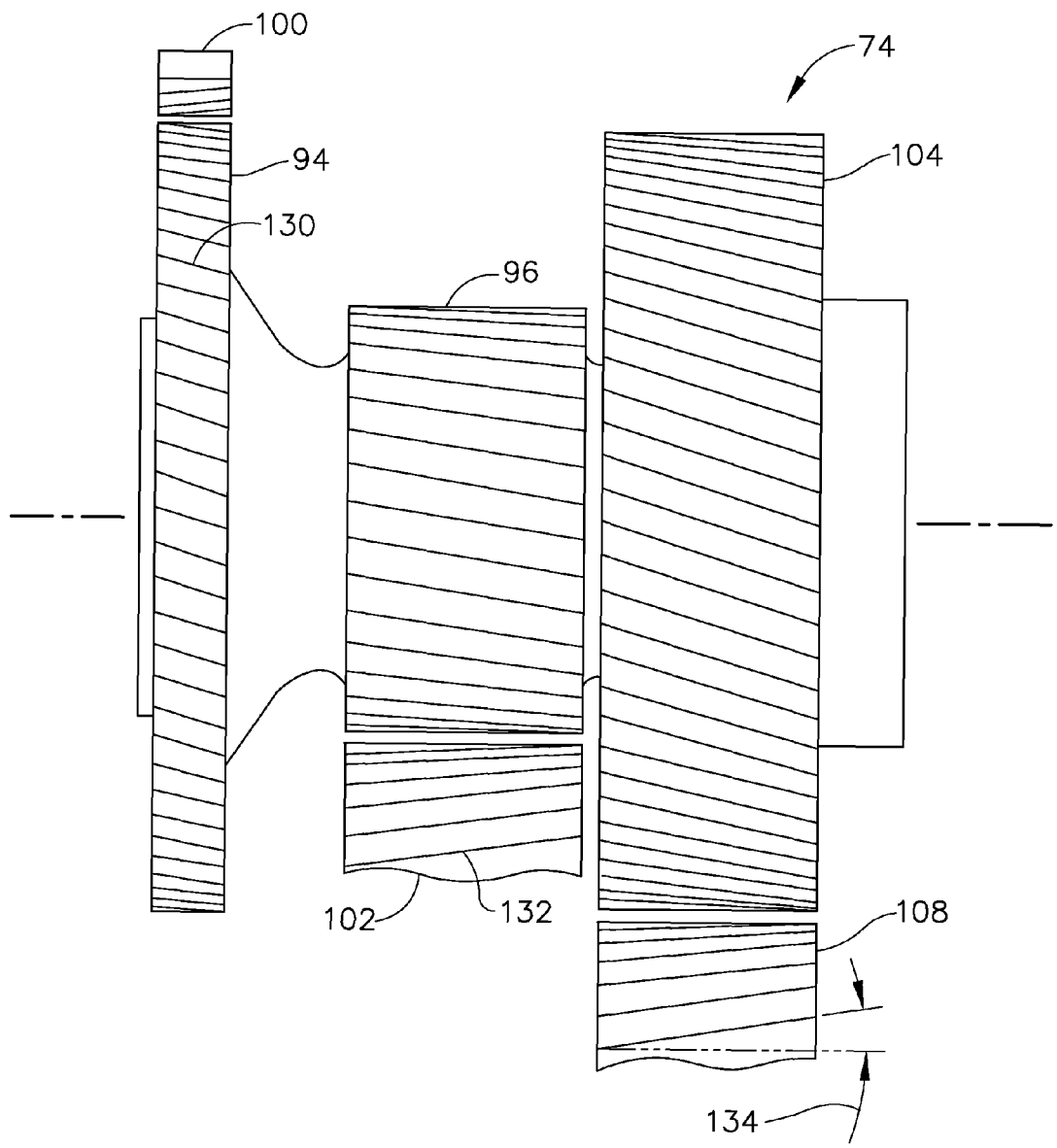
FIG. 5 is side view diagrammatical illustration of a helical planetary gear in the gear train illustrated in FIG. 3.

Referring to FIGS. 4 and 5, gear tooth forces of the axially spaced apart forward and aft sets of output teeth 94, 96 when they mesh with the second fan ring gear 100 and the first fan external gear 102 respectively generate moments that greatly reduce the bearing reaction loads and the loads on the planet carrier. The arrangement of the axially spaced apart forward and aft sets of output teeth 94, 96 and the input gear 104 provides a means to position the outer forward and aft carrier flanges 79, 81 at an optimized axial location to equalize the deflection of the spindles 75 and planetary gear hub 92 at the forward and aft roller bearings 111, 112, resulting in minimal gear tooth misalignment. The gear tooth forces of the axially displaced internal ring gear mesh result in an overturning moment on each planet gear assembly that reduces the radial loads at the forward and aft roller bearings 111, 112.

In a preferred embodiment of the gearbox 56, the planetary gears 74 and their mating teeth or gears are helical as illustrated in FIG. 5. The forward and aft set of output teeth 94, 96, and the input gear 104 of the planetary gears 74 are illustrated as having right hand helical teeth 130. The second fan ring gear 100, the first fan external gear 102, and the sun gear 108 are illustrated as having left hand helical teeth 132. They may of course be reversed. The right and left hand helical teeth 130, 132 provide a strong robust mesh and have a helix angle 134 that is selected to create a planetary gear moment to reduce the bearing radial loads caused by the gear tooth separating forces. The helix angles are selected to balance the axial force of the input mesh between the input gear 104 of the planetary gears 74 and the sun gear 108 with the sum of the axial forces of the two output meshes of the forward set of output teeth 94 of the planetary gears 74 with the second fan ring gear 100 and the aft set of output teeth 96 of the planetary gears 74 with the first fan external gear 102.

The input sun gear 108 has a first axial force that is in the opposite direction to that of the low pressure turbine 32, and each of the second fan ring gear 100 and the first fan external gear 102 has a second axial force that is in the opposite direction to that of the fan thrust. The net thrust loads that are reacted by the low pressure turbine and fan bearings and their supporting structure are therefore greatly reduced.

Referring to FIG. 2, the first fan stage 60 is connected by a first cone 124 to the first fan external gear 102. The second fan stage 62 is connected by a second cone 126 to the second fan ring gear 100. A thrust bearing 140 includes a radially outer race 146 fixedly coupled to the fan frame 67 and is operable for transferring thrust loads developed or generated by counter-rotating from the counter-rotatable first and second fan stages 60, 62 of the fan section 16 to the fan frame 67. Fan thrust roller bearings 148 are disposed between inner race 142 and the outer race 146 of the thrust bearing 140.

Axially spaced apart forward differential roller bearing 150 and aft thrust roller bearing 152 are radially disposed between the first cone 124 and the low pressure shaft 36. A thrust first ball bearing 154 is radially disposed between the second cone 126 and the first cone 124 thus providing thrust load transferring from the counter-rotatable first and second fan stages 60, 62 to be transferred to the fan frame 67. A differential third roller bearing 162 is radially disposed between the second cone 126 and an axially forwardly extending cone 115 of the fan frame 67. The third roller bearing 162 also provides radial support for the first and second fan stages 60, 62. The bearings facilitate maintaining the first and second fan stages 60, 62 in a relatively fixed axial and radial positions as well as transferring thrust loads and/or forces generated by the first and second fan stages 60, 62 to the fan frame 67. A fan frame thrust bearing 170 is disposed between the frame 67 and second fan ring gear 100 attached to the second cone 126 to provide thrust transfer from the second fan stage 62 to the fan frame 67. The forward differential roller bearing 150 and aft thrust roller bearing 152 and the first ball bearing 154 function as differential bearings to support and/or transfer thrust loads and/or forces from the first and second fan stages 60, 62 to the thrust bearing 140.

The present invention has been described in an illustrative manner. It is to be understood that the terminology which has been used is intended to be in the nature of words of description rather than of limitation. While there have been described herein, what are considered to be preferred and exemplary embodiments of the present invention, other modifications of the invention shall be apparent to those skilled in the art from the teachings herein and, it is, therefore, desired to be secured in the appended claims all such modifications as fall within the true spirit and scope of the invention.

Accordingly, what is desired to be secured by Letters Patent of the United States is the invention as defined and differentiated in the following claims:

What is claimed is:

1. An epicyclic gear train comprising:
    planetary gears rotatably mounted on spindles supported by an annular carrier,
    each of the planetary gears including a hollow planetary gear hub and axially spaced apart forward and aft sets of output teeth extending radially outwardly from the planetary gear hub,
    axially spaced apart forward and aft roller bearings disposed between the planetary gears and the spindles,
    an input gear fixedly attached to the planetary gear hub aft of the aft set of output teeth of each of the planetary gears, and
    the forward roller bearing being axially aligned with the forward set of output teeth and the aft roller bearing being axially adjacent to the input gear.

2. An epicyclic gear train as claimed in claim 1, further comprising a ring gear circumscribing and meshing with the forward set of output teeth and an external gear meshing with the aft set of output teeth.

3. An epicyclic gear train as claimed in claim 2, further comprising the input gear of each of the planetary gears meshing with a sun gear.

4. An epicyclic gear train as claimed in claim 2, further comprising the forward set of output teeth meshing with the ring gear radially outwardly of the spindles and the aft set of output teeth meshing with the external gear radially inwardly of the spindles.

5. An epicyclic gear train as claimed in claim 4, further comprising the input gear of each of the planetary gears meshing with a sun gear radially inwardly of the spindles.

6. An epicyclic gear train as claimed in claim 5, further comprising the forward and aft set of output teeth, the input gear of the planetary gears, the ring gear, the external gear, and the sun gear being helical.

7. An epicyclic gear train comprising:
    planetary gears rotatably mounted on spindles supported by an annular carrier,
    each of the planetary gears including a hollow planetary gear hub and axially spaced apart forward and aft sets of output teeth extending radially outwardly from the planetary gear hub,
    axially spaced apart forward and aft roller bearings disposed between the planetary gears and the spindles,
    a ring gear circumscribing and meshing with the forward set of output teeth and an external gear meshing with the aft set of output teeth,
    an input gear fixedly attached to the planetary gear hub aft of the aft set of output teeth of each of the planetary gears,
    the forward set of output teeth meshing with the ring gear radially outwardly of the spindles and the aft set of output teeth meshing with the external gear radially inwardly of the spindles,
    the input gear of each of the planetary gears meshing with a sun gear radially inwardly of the spindles,
    the forward roller bearing being axially aligned with the forward set of output teeth and the aft roller bearing being axially adjacent to the input gear.

8. An epicyclic gear train as claimed in claim 7, further comprising the forward and aft set of output teeth, the input gear of the planetary gears, the ring gear, the external gear, and the sun gear being helical.

9. An epicyclic gearbox comprising:
    an epicyclic gear train including planetary gears rotatably mounted on spindles supported by forward and aft conical carrier frames of an annular carrier,
    the forward and aft conical carrier frames including radially outer forward and aft carrier flanges respectively,
    the forward and aft conical carrier frames including radially inner forward and aft support flanges respectively fixedly supporting the spindles therebetween,
    the forward and aft support flanges connected by conical forward and aft support beams to the forward and aft carrier flanges,
    each of the planetary gears including a hollow planetary gear hub and axially spaced apart forward and aft sets of output teeth extending radially outwardly from the planetary gear hub,
    an input gear fixedly attached to the planetary gear hub aft of the aft set of output teeth of each of the planetary gears, the input gear of each of the planetary gears meshing with a sun gear, and axially spaced apart forward and aft roller bearings disposed between the planetary gears and the spindles.

10. An epicyclic gearbox as claimed in claim 9, further comprising the forward and aft roller bearing being axially aligned with or adjacent to the spaced apart forward set of output teeth and the input gear respectively.

11. An epicyclic gearbox as claimed in claim 10, further comprising the forward roller bearing being axially aligned with the forward set of output teeth and the aft roller bearing being axially adjacent to the input gear.

12. An epicyclic gearbox as claimed in claim 10, further comprising:

the forward set of output teeth meshing with the ring gear radially outwardly of the spindles, the aft set of output teeth meshing with the external gear radially inwardly of the spindles, and the input gear of each of the planetary gears meshing with the sun gear radially inwardly of the spindles.

13. An epicyclic gearbox as claimed in claim 12, further comprising the forward and aft set of output teeth, the input gear of the planetary gears, the ring gear, the external gear, and the sun gear being helical.

14. A turbofan gas turbine engine comprising:

a fan section including counter-rotatable first and second fan stages radially supported, at least in part, by a fan frame, a low pressure turbine downstream of the fan section and drivingly connected to the first and second fan stages by a low pressure shaft through an epicyclic gear train in an epicyclic gearbox, the epicyclic gear train including planetary gears rotatably mounted on spindles supported by an annular carrier, each of the planetary gears including a hollow planetary gear hub and axially spaced apart forward and aft sets of output teeth extending radially outwardly from the planetary gear hub, axially spaced apart forward and aft roller bearings disposed between the planetary gears and the spindles, an input gear fixedly attached to the planetary gear hub aft of the aft set of output teeth of each of the planetary gears, and the forward roller bearing being axially aligned with the forward set of output teeth and the aft roller bearing being axially adjacent to the input gear.

15. A turbofan gas turbine engine comprising:

a fan section including counter-rotatable first and second fan stages radially supported, at least in part, by a fan frame, a low pressure turbine downstream of the fan section and drivingly connected to the first and second fan stages by a low pressure shaft through an epicyclic gear train in an epicyclic gearbox, the epicyclic gear train including planetary gears rotatably mounted on spindles supported by an annular carrier, each of the planetary gears including a hollow planetary gear hub and axially spaced apart forward and aft sets of output teeth extending radially outwardly from the planetary gear hub, axially spaced apart forward and aft roller bearings disposed between the planetary gears and the spindles, an input gear fixedly attached to the planetary gear hub aft of the aft set of output teeth of each of the planetary gears, the second fan stage connected to a ring gear circumscribing and meshing with the forward set of output teeth, the first fan stage connected to an external gear meshing with the aft set of output teeth, an input gear fixedly attached to the planetary gear hub aft of the aft set of output teeth of each of the planetary gears, and the input gear of each of the planetary gears meshing with a sun gear connected to the low pressure shaft.

16. A turbofan gas turbine engine as claimed in claim 15, further comprising:

the forward set of output teeth meshing with the ring gear radially outwardly of the spindles, the aft set of output teeth meshing with the external gear radially inwardly of the spindles, and the input gear of each of the planetary gears meshing with the sun gear radially inwardly of the spindles.

17. A turbofan gas turbine engine as claimed in claim 16, further comprising the forward and aft roller bearing being axially aligned with or adjacent to the spaced apart forward set of output teeth and the input gear respectively.

18. A turbofan gas turbine engine as claimed in claim 17, further comprising the forward and aft set of output teeth, the input gear of the planetary gears, the ring gear, the external gear, and the sun gear being helical.

19. A turbofan gas turbine engine as claimed in claim 17, further comprising the forward roller bearing being axially aligned with the forward set of output teeth and the aft roller bearing being axially adjacent to the input gear.

20. A turbofan gas turbine engine as claimed in claim 19, further comprising the forward and aft set of output teeth, the input gear of the planetary gears, the ring gear, the external gear, and the sun gear being helical.

21. A turbofan gas turbine engine as claimed in claim 17, further comprising the spindles supported by forward and aft conical carrier frames of the annular carrier, the forward and aft conical carrier frames including radially outer forward and aft carrier flanges respectively and mounted to and supported by the fan frame, the forward and aft conical carrier frames including radially inner forward and aft support flanges respectively fixedly supporting the spindles therebetween, and the forward and aft support flanges connected by conical forward and aft support beams to the forward and aft carrier flanges.

* * * * *